United States Patent
Juma

(10) Patent No.: US 7,621,408 B2
(45) Date of Patent: Nov. 24, 2009

(54) FIBER REINFORCED FILTER FOR MOLTEN METAL FILTRATION

(75) Inventor: Kassim Juma, Straffordshire (GB)

(73) Assignee: Sud-Chemie HiTech, Inc., Alfred Station, NY (US)

( * ) Notice: Subject to any disclaimer, the term of this patent is extended or adjusted under 35 U.S.C. 154(b) by 319 days.

(21) Appl. No.: 10/516,443

(22) PCT Filed: May 27, 2003

(86) PCT No.: PCT/EP03/05538

§ 371 (c)(1),
(2), (4) Date: Nov. 30, 2004

(87) PCT Pub. No.: WO03/101584

PCT Pub. Date: Dec. 11, 2003

(65) Prior Publication Data

US 2005/0229746 A1    Oct. 20, 2005

(30) Foreign Application Priority Data

May 31, 2002    (EP) .................................. 02012031

(51) Int. Cl.
*B01D 39/20* (2006.01)
*B01D 39/00* (2006.01)
*B01D 29/00* (2006.01)

(52) U.S. Cl. ........................ 210/505; 210/503; 210/504; 210/510.1

(58) Field of Classification Search ................. 210/488, 210/490, 500.1, 502.1, 503, 504, 505, 506, 210/508, 509, 510.1; 501/88, 90, 95.1, 95.2, 501/97.1, 97.4, 99, 100, 103, 109, 127, 141, 501/153, 154, 94, 96.1, 96.3; 428/357
See application file for complete search history.

(56) References Cited

U.S. PATENT DOCUMENTS

| 3,309,437 | A | | 3/1967 | Harnett | |
|---|---|---|---|---|---|
| 3,574,646 | A | * | 4/1971 | Wismer et al. | 501/82 |
| 5,045,511 | A | | 9/1991 | Bosomworth | |
| 5,371,050 | A | * | 12/1994 | Belitskus et al. | 501/95.2 |
| 5,520,823 | A | * | 5/1996 | Jones et al. | 210/767 |
| 5,750,026 | A | * | 5/1998 | Gadkaree et al. | 210/502.1 |
| 7,138,084 | B2 | * | 11/2006 | Bell et al. | 266/227 |
| 2001/0036894 | A1 | * | 11/2001 | Juma et al. | 501/96.4 |
| 2004/0128857 | A1 | * | 7/2004 | Bell et al. | 34/480 |
| 2005/0035055 | A1 | * | 2/2005 | Bali | 210/502.1 |
| 2005/1006734 | | * | 3/2005 | Noack et al. | 210/503 |
| 2005/0263449 | A1 | * | 12/2005 | Juma | 210/323.1 |
| 2006/0264315 | A1 | * | 11/2006 | Bell et al. | 501/99 |
| 2007/0090047 | A1 | * | 4/2007 | Bell et al. | 210/510.1 |

FOREIGN PATENT DOCUMENTS

| EP | 0388010 | 9/1990 |
|---|---|---|
| WO | WO 01/40414 | 6/2001 |

* cited by examiner

*Primary Examiner*—John Kim
(74) *Attorney, Agent, or Firm*—RatnerPrestia

(57) ABSTRACT

The present invention relates to a fiber reinforced ceramic filter for molten metal filtration that comprises a bonded network of graphitized carbon and a method for producing such filters.

11 Claims, No Drawings

FIBER REINFORCED FILTER FOR MOLTEN METAL FILTRATION

The present invention relates to a fiber reinforced ceramic filter for molten metal filtration that comprises a bonded network of graphitized carbon and a method for producing such filters.

For the processing of molten metals it is desirable to remove exogenous intermetallic inclusions such as from impurities of the raw materials, from slag, dross and oxides which form on the surface of the melt and from small fragments of refractory materials that are used to form the chamber or vessel in which the molten metal melt is formed.

Removal of these inclusions forms a homogenous melt that insures high quality of products especially in the casting of steel, iron and aluminum metals. Currently, ceramic filters are widely used due to their high ability to withstand extreme thermal shock due to their resistance to chemical corrosion and their ability to withstand mechanical stresses.

The production of such ceramic filters generally involves the mixing of ceramic powder with suitable organic binders and water in order to prepare a paste or slurry. The slurry is used to impregnate a polyurethane foam which subsequently is dried and fired at a temperature in the range of from 1000 to 1700° C. By this treatment the combustible material is burned off during sintering to produce a porous body. U.S. Pat. Nos. 2,360,929 and 2,752,258 may serve as examples for the common procedure.

Also, an open pore filter that instead of a random distribution of irregular interconnecting passages consists of a series of parallel ducts passing through the material as generally being made by hydraulic pressing a damp ceramic powder and organic binder into a mold containing perpendicular pins. A perforated structure is thus obtained which can be in the form of a disk or block. The perforated article is then fired at a temperature in the range of from 1000 to 1700° C. depending on the final application to produce a perforated disc. During firing a ceramic and/or glassy bond is developed.

WO 01/40414 A describes the use of pressurized mold. This patent depends on regulating the pressure inside the mold to obtain porous structure. Also the porosity in this case is not fully open. The claim of filtration usage is one of many usage and there is no prove that the filter was ever actually used to metal filtration. Also only aluminum was mentioned for filtration since such filter is too weak for steel filtration. The patent describes only a carbon filter without any ceramic. The process of making the filter is based on regulating the pressure inside the mold. This process is difficult to control.

U.S. Pat. No. 4,514,346 uses phenolic resin to react with silicon at high temperature to form silicon carbide. There is no carbon bonding involved. This patent is for making porous silicon carbide only. Temperature in excess of 1600° C. is used to obtain silicon carbide. The process is non-aqueous. The porosity obtained from this process is closed porosity which has no use in filtration requiring open porosity.

GB-A 970 591 deals with making high density low permeability graphite articles. It uses an organic solvent, namely furfuryl alcohol as solvent and not water. Binder in the form of pitch is used at 25% with no ceramic at all. Final heating is in excess of 2700° C. The porosity is closed porosity rather than open porosity.

U.S. Pat. No. 3,309,433 describes a method for manufacturing high density graphite. It uses hot pressing as a means to obtain high density graphite articles for nuclear applications. It used special material called dibenzanthrone to bind the graphite. It has no useful application in metal filtration field. It does not use any ceramic in the process. It uses high temperature of up to 2700° C.

EP 0 251 634 B1 describes an appropriate process for making defined porous ceramic bodies having smooth walled cells formed by the pore formers, and pores with round edges, which interconnect the cells.

U.S. Pat. No. 5,520,823 relates to filters for aluminum only. The bonding is obtained using borosilicate glass. Firing is carried out in air and a considerable amount graphite would be lost due to the oxidation by air. Filters used for aluminum filtration are usually fired at around 1200° C. while those intended for the use of iron are fired at temperatures of 1450° C. and for steel at above 1600° C.

Despite their wide spread use for metal filtration ceramic filters of the above mentioned types have several drawbacks that limit their applicability:

1. Ceramic filters, although preheated, tend to be clogged by freezing particles on the first contact with the molten metal. For this purpose usually superheated molten metal that is metal at a temperature of about 100° C. over liquidus temperature is used for casting to prevent clogging of the filters. This practice is extreme wasteful in terms of energy and cost and any improvement that reduces processing temperature of the molten metal is of great benefit. Carbon coatings have been applied in the prior art on the surface of ceramic filters to reduce the thermal mass of the part that comes into direct contact with the molten metal.

Also an exothermically reacting thermite material applied to a carbon-coated surface of the ceramic filter has been proposed by EP 0 463 234 B1. The latter solution, while reducing the temperature necessary for the flow of the molten metal, adds to the cost of production of the filters and very narrowly limits the applicability as the thermite coating has to be in compliance with the type of molten metal for which it is used.

Anyway, both carbon and thermite coating serve in overcoming the drawback of high thermal mass of the ceramic filter while the challenge of several more disadvantages is not met.

2. Ceramic and glassy type bonds tend to soften and creep at high temperature which very often results in erosion of the filter and subsequent contamination of the melt.

3. Cracking due to thermal shock or chemical (reductive) corrosion by the hot metal melt is a problem often encountered with ceramic and glass bonded filters.

4. The need for extremely high firing temperatures, especially in the case of ceramics intended for steel filtration, is a severe drawback of conventional ceramic filters which is even worse when the need for high cost—ceramic raw material is considered.

5. In addition, the use of zirconia with its relatively strong background radiation is hazardous and should be avoided.

Co-pending EP 01121044.0, filed on 01. Sep. 2001, relates to a ceramic filter suitable for molten metal filtration comprising a ceramic powder bonded by a network of graphitized carbon. Carbon bonded ceramics in general are weak and suffers from low mechanical strength. The carbon bonded filters according to this reference have a limited mechanical strength which causes problems during transportation and usage and limit the capacity of the filters in withstanding the pressure of molten metal on it.

Also these filters are friable and tends to break into bits which falls in the mold prior to casting causing contamination of the casting.

The object of the present invention is thus to provide a filter for metal filtration which improves the mechanical strength and stiffness.

In the ceramic filter suitable for molten metal filtration according to the present invention a three dimensional network of graphitizable carbon bonding and fibers is used to bind ceramic powder.

In a first embodiment, the invention relates to a ceramic filter suitable for molten metal filtration comprising a ceramic powder and fibers bonded by a network of graphitized carbon.

The term "graphitizable" means that the carbon bonding obtained by pyrolysis of the carbon precursor can be converted into a graphite like bonding on heating to a higher temperature in the absence of air. Graphitizable carbon is distinguished from that of a glassy carbon by the fact that it is impossible to convert glassy carbon to a graphite like bond no matter how high temperature it was heated to.

Carbon bonding of this type exhibits the following advantageous features:

Significantly cheaper to produce.
Firing can be carried out at much lower temperature in order to develop the full carbon bonding network from the carbon bond precursor. In general the filters have to be fired at a temperature in the range of from 500° C. to 1000° C.
Significantly lower superheat is required.
Low thermal mass.
Better thermal shock resistance.
Contamination free.

The carbon bonded filters according to the present invention exhibit a relatively low thermal mass. A result of this is that there is no need to overheat the metal to be filtered which reduces energy consumption.

During the continuous work to improve the quality and the performance of carbon bonded filters, the inventor now discovered that adding up to 20%, in particular up to 10% by weight of fibers to the filter recipes contribute to a significant improvement in the performance of the filters. The improvement is mainly due to increase mechanical strength, improve stiffness, higher impact resistance and better thermal shock. The improvement is manifest it self by increase filtration capacity, better mechanical integrity and less contamination to the steel casting. Due to the outstanding mechanical strength of the carbon bonding in combination with fibers at high temperature no softening or bending can take place during the process of metal casting. This contributes to an even cleaner metal cast.

Graphitizable carbon bonded filters further including fibers according to the present invention offer the following advantages compared with glassy carbon bonded filters:

High oxidation resistance
High mechanical strength
High impact resistance
Low microporosity
Low specific surface
Structural flexibility
Non-brittle behavior
Economical use.

For optimal performance the graphitized carbon that constitutes besides the ceramic powder a bonded network of graphitized carbon according to the present invention should be present in an amount up to 15% by weight of the filter, preferably up to 10% by weight, even more preferred in an amount of at least 2% by weight up to 5% by weight.

Traditionally, fibers are added to ceramic and composite materials in order to improve mechanical strength and gives stiffness to the articles. These fibers could be either metal fibers, organic fibers such as polyester fibers, viscose fibers, polyethylene fibers, polyacrylonitrile (PAN) fibers, aramid fibers, polyamide fibers, etc., or ceramic fibers such as aluminosilicate fibers, alumina fibers or glass fibers, or carbon fibers which consist of 100% carbon. All these types of fibers are used to a different degrees in ceramic to give added advantaged to the properties of ceramic such as high mechanical strength, high impact resistance and better thermal shock.

The inventor has found that addition of any of the types of fibers to the carbon bonded filters of the prior art causes a significant improvement in the mechanical strength of the filters as well as improvement in the impact resistance and thermal shock. The improvement in strength could be as much as three time (i.e. from 0.5 MPa to 1.5 MPa). Impact resistance and thermal shock resistance also increase accordingly. As a result of this improvement, the carbon filters can now at least double their filtration capacity. For example a carbon filter with 100 mm×100 mm×20 mm which have a normal capacity of 100 kg filtration of steel. The same filter but with 5% added ceramic filters has a capacity to filter 200 kg of steel. In particular ceramic fibers and carbon fibers do not change their physical properties when they are incorporated in the filter due to their thermal stability. Organic fibers, on the other hand are converted during firing of the filters to carbon fibers (i.e. They undergo a pyrolysis process). This is considered to be beneficial with respect to ceramic or metal fibers.

The inventor has found that the beneficial effect of the addition of fibers depends on the amount of fibers added, length of the fibers, nature and type of fibers added. The higher the level of fibers added the stronger the filter become. However very high level of fibers is not desirable because it has a negative effect on the rheology of the slurry. Best results are obtained from incorporating carbon fiber followed by ceramic fibers. On the other hand, carbon fibers are the most expensive while organic fibers are the cheapest. Organic fibers are the most economic to use since they are added at much lower level than either carbon or ceramic fibers (less than 2%). However, organic fibers interfere with the rheology of the slurry more than the ceramic or the carbon fibers. The form of fibers is either chopped or bulk fibers to be added during mixing of the filter ingredients. No extra mixing technique is required.

The filters according to the present invention preferably contain 0.1 to 20% by weight, in particular 1 to 10% by weight of said fibers, more particularly 5%.

The fibers used according to the present invention preferably have a length from 0.1 mm to 5 mm.

In one embodiment of the present invention the carbon bonded ceramic filters are produced in a first process comprising the steps:

a) impregnating a foam made of thermoplastic material with a slurry containing fibers, a graphitizable carbon bonding precursor, ceramic powder, and optionally other additives, b) drying, optionally followed by one or two coatings of the same slurry in order to increase the mass, followed by final drying, c) firing the impregnated foam in non-oxidizing and/or reducing atmosphere at a temperature in the range of from 500 to 1000° C., in particular from 600° C. to 700° C., whereby the carbon bonding precursor is converted at least partially or fully to a bonded network of graphitized carbon.

In this process the thermoplastic material used for the foam to be impregnated with the slurry preferably contains or consists of polyurethane.

It is advantageous to mix fibers, carbon bonding precursor prior to impregnating the foam with ceramic powder, water, organic binder, and additives to control the rheology, which in one embodiment of the invention may be present in an amount of up to 2 parts by weight, preferably in a range of from 0.1 to 2 parts by weight.

In another embodiment of the present invention a second type of carbon bonded ceramic filter is produced by a process comprising the steps
a) pressing a semi-damp mixture comprising fibers, ceramic powder and a graphitizable bonding precursor, and optionally other additives in a hydraulic press,
b) pressing to obtain a perforated article in the shape of a disk or a block,
c) firing the perforated article in non-oxidizing and/or reducing atmosphere at a temperature in the range of from 500° C. to 1000° C., in particular from 600° C. to 700° C., whereby the carbon bonding precursor is converted partially or fully to a bonded network of graphitized carbon.

The source of the carbon bond, that is the carbon bond precursor is preferably high melting pitch (HMP) because it offers optimal properties with respect to workability, cost and product quality. However, it must be noted that other carbon bond precursors can also be used to produce carbon bonded materials, such as synthetic or natural resins and sinterable carbon as long as it is graphitizable and converted to a bonded network of graphitized carbon upon firing according to the present invention. Thus, synthetic resin binders that form a glassy carbon which cannot be converted to graphite may not be considered as carbon bond precursors as the product suffers from low oxidation resistance, low mechanical strength, high brittleness and lower heat resistance.

Also, for economical as well as ecological reasons the carbon bond precursor should be compatible with water. However, organic-solvent based carbon bonding precursors may be used as well.

In further embodiments these processes use a slurry (for the production of a carbon bonded ceramic filter of the first type) or a semi-damp mixture (for the production of the carbon bonded ceramic filter of the second type) that comprises:
fibers in the range of 0.1 to 20% by weight,
a graphitizable carbon bonding precursor in the range of from 2 (5) to 15 (25) parts by weight,
ceramic powder in the range of from 0 (20) to 95 (80) parts by weight, anti-oxidation material in the range of from 0 to 80 parts by weight, graphite in the range of from 0 to 90 parts by weight,
organic binder in the range of from 0 to 10, in particular 0.2 to 2 parts by weight and,
dispersion agent in the range of from 0 to 4, in particular 0.1 to 2 parts by weight.

Water is added in a quantity as required. For the purpose of slurry-preparation, 20 to 70 parts by weight are necessary depending on the nature of the ceramic filler materials. For the semi-damp mixture used for pressing, water is necessary in an amount of from 2 to 10 parts by weight, depending of the nature of the ceramic filler materials.

The ceramic powder may comprise zirconia, silica, alumina, brown fused alumina, magnesia, any type of clay, talcum, mica, silicon carbide, silicon nitride and the like or any mixture thereof. Graphite may also be used as a substitute for ceramic powder.

Preferred anti-oxidation materials according to the present invention are metallic powder such as steel, iron, bronze, silicon, magnesium, aluminum, boron, zirconium boride, calcium boride, titanium boride and the like, and/or glass frits containing 20 to 30% by weight of boric oxide.

Organic binders that are preferred according to the present invention are green binders such as polyvinyl alcohol (PVA), starch, gum arabic, sugar or the like or any combination thereof. These binders may be added to improve the mechanical properties of the fillers during handling prior to firing. Starch and gum arabic may also be used as thickening agent.

Preferred dispersion agents according to the present invention are Despex®, ligninsulphonate or the like, or any combination thereof which help to reduce the water level in the slurry and improve the rheology.

In a further embodiment of the present invention the slurry or semi-damp mixture may comprise a plasticizer such as polyethylene glycol (preferred molecular weight: 500 to 10000) in the range of from 0 to 2 parts by weight, preferably 0,5 to 1 part by weight and/or an anti-foam agent such as silicon anti-foam in the range of from 0 to 1 part by weight, preferably 0,1 to 0,5 parts by weight. The invention is further illustrated by the following examples:

EXAMPLES

As graphitizable high melting pitch (HMP) a coal-tar pitch was used having a glass transition temperature of 210° C., a cooking value of 85%, an ash value of 0,5% and which was available as a fine powder.

In all examples the resultant mixture was fired in inert atmosphere at a temperature in the range of from 600° C. to 900° C. for 20 to 120 min at a heating rated in the range of from 1° C./min to 10° C./min.

A: Filters According to the First Type:

Example 1

A polyurethane foam was cut to the required size and impregnated with a slurry containing 70 g of un-chopped alumina silicate ceramic fibers, 70 g of said high melting pitch powder, 1000 g of ceramic powder (calcined alumina), 70 g of a dispersant (ligninsulphonate), 4 g of a thickening agent (starch) and 270 g of water.

The filter was either impregnated manually or by a machine containing rollers used for this purpose. After impregnation the filter was dried using hot air and/or a microwave drier. The coating was applied by a spraying air gun. The filter was dried once more and transferred to a firing furnace with reducing or non-oxidizing atmosphere. The furnace was heated at a rate from 1° C./min to 10° C./min depending on the composition of the slurry, size of the filter, size of the furnace etc.

These filters have a strength of up to 1.5 MPa. During field trials it was found that no superheat is required when using these filters since extra heat was generated upon contact of molten metal with the filter (exothermic reaction).

Also heating these filters to a temperature above 1500° C. results in forming a fiber reinforced graphite like bonding. Although such treatment would improve the overall properties of the filter, it is not required for the purpose of molten metal filtration.

Example 2

Example 1 was repeated with the same recipe but using 70 g of 0.2 mm chopped carbon fibers to replace aluminosilicate fibers. The result was even better strength of up to 2 MPa.

Example 3

Example 1 was repeated with the same recipe but using 2% by weight of 0.250 mm polyester fibers to replace aluminosilicate fibers The result was a strength of higher than 2 MPa.

B: Filters According to the Second Type:

Example 4

A mixture of 50 g of aluminosilicate ceramic fibers, 70 g of said high melting pitch powder, 900 g of ceramic powder (calcined alumina), 100 g of graphite powder, 20 g PVA binder and 60 g of water was prepared in a Hobart or Eirich mixer. The aim of the mixing process was to make a semi-damp and homogenous mixture. A predetermined weight of the mixture was placed in a steel mold which contained vertical pins. Pressing the mix produced a perforated article. This perforated article was then removed form the mold, dried and fired in a non-oxidizing or reducing atmosphere at a temperature of 700° C. for 1 h with a heating rate of 2° C./min. The strength of the pressed filters increased from 7 MPa to 10 MPa due to the addition of fibers.

Example 5

Example 4 was repeated with the same recipe but using 70 g of 0.2 mm chopped carbon fibers to replace aluminosilicate fibers. The result was a strength of up to 12 MPa.

Example 6

Example 4 was repeated with the same recipe but using 2% by weight of 0.250 mm polyester fibers to replace aluminosilicate fibers. The result was a strength of higher than 15 MPa.

The fiber reinforced graphitizable carbon bonded perforated filter was used in a field trial to filter molten steel. It was found that the filter did not require molten metal superheat since it generated heat on contact of molten metal with the filter which was enough to keep the molten steel flow during filtration. This was due to the exothermic reaction of the filter surface and the molten steel. Also, the filter did not suffer from thermal shock or distortion during the test. These advantages will open the door for improved economic and efficient filtration of casting steel.

The invention claimed is:

1. A ceramic filter for molten metal filtration comprising a ceramic powder and fibers bonded by a network of graphitizable carbon fired in a non-oxidizing atmosphere at a temperature from 500° C. to 1000° C., wherein the graphitizable carbon is produced from graphitizable carbon precursor present in an amount from 2% to 15% by weight.

2. The filter of claim 1, wherein the ceramic powder is selected from a group consisting of zirconia, silica, alumina, brown fused alumina, magnesia, clay, talcum, mica, silicon carbide, silicon-nitride, graphite and mixtures thereof.

3. The filter of claim 1, wherein the filter comprises graphitizable carbon produced from 5 to 15 wt % graphitizable carbon precursor, and wherein the graphitizable carbon is fired in a non-oxidizing atmosphere at a temperature from 500° C. to 1000° C.

4. The filter of claim 1, wherein the fibers are selected from a group consisting of ceramic fibers, glass fibers, organic fibers, carbon fibers, metal fibers and mixtures thereof.

5. The filter of claim 1, wherein the filter comprises 1-10 wt % fibers.

6. A filter for molten metal filtration comprising fibers bonded by a network of graphitizable carbon fired in a non-oxidizing atmosphere at a temperature from 500° C. to 1000° C., wherein the graphitizable carbon is produced from graphitizable carbon precursor present in an amount from 2% to 15% by weight.

7. The filter of claim 6, wherein the fibers are selected from a group consisting of ceramic fibers, glass fibers, organic fibers, carbon fibers, metal fibers and mixtures thereof.

8. The filter of claim 7, wherein the ceramic fibers are selected from a group consisting of alumina fibers, silica fibers, aluminosilicate fibers and mixtures thereof.

9. The filter of claim 7, wherein the organic fibers are selected from a group consisting of polyester fibers, polyacrylnitrile fibers, polyethylene fibers, polyamide fibers, viscose fibers, aramid fibers and mixtures thereof.

10. The filter of claim 6, wherein the filter comprises 1-10 wt % fibers.

11. The filter of claim 6, wherein the fibers have a length from 0.1 to 5 mm.

\* \* \* \* \*